(12) United States Patent
Vargas Parker

(10) Patent No.: US 11,720,853 B2
(45) Date of Patent: Aug. 8, 2023

(54) SYSTEM FOR LOGISTIC MONITORING, CONTROL AND PRESERVATION OF INVENTORY STOCKS OF GOODS

(71) Applicant: Juan Pablo Vargas Parker, Santiago (CL)

(72) Inventor: Juan Pablo Vargas Parker, Santiago (CL)

( * ) Notice: Subject to any disclaimer, the term of this patent is extended or adjusted under 35 U.S.C. 154(b) by 18 days.

(21) Appl. No.: 16/483,891

(22) PCT Filed: Feb. 7, 2017

(86) PCT No.: PCT/IB2017/050657
§ 371 (c)(1),
(2) Date: Aug. 6, 2019

(87) PCT Pub. No.: WO2018/146513
PCT Pub. Date: Aug. 16, 2018

(65) Prior Publication Data
US 2020/0019919 A1    Jan. 16, 2020

(51) Int. Cl.
*G01C 21/32* (2006.01)
*G06Q 10/087* (2023.01)
*G06Q 10/0831* (2023.01)
*G06Q 10/0832* (2023.01)
(Continued)

(52) U.S. Cl.
CPC ....... *G06Q 10/087* (2013.01); *G06Q 10/0831* (2013.01); *G06Q 10/0832* (2013.01); *G06Q 50/28* (2013.01); *G08B 13/2462* (2013.01)

(58) Field of Classification Search
CPC .............. G06Q 10/087; G06Q 10/083; G06Q 10/0832; G06Q 50/28
See application file for complete search history.

(56) References Cited

U.S. PATENT DOCUMENTS

| 2003/0046566 | A1 | 3/2003 | Holopainen |
| 2005/0087235 | A1* | 4/2005 | Skorpik ................ F16K 37/00 137/554 |
| 2006/0015543 | A1* | 1/2006 | Humphrey ....... G06Q 10/08355 |

(Continued)

OTHER PUBLICATIONS

International Search Report for Application No. PCT/IB2017/050657.
Written Opinion for Application No. PCT/IB2017/050657.

*Primary Examiner* — Talia F Crawley
(74) *Attorney, Agent, or Firm* — Ladas & Parry LLP

(57) ABSTRACT

System for logistic monitoring, control and preservation of inventory stocks of goods while they are transported by air, sea, land and/or kept in depository sites, through the processing of staggering coded commands, received remotely through wireless telemetry actions, the system comprising: an inventory stock control and monitoring system, provided with status measurement sensor, electromechanical and pneumatic device, pneumatic sliding actuator device, sliding actuator engaging device, engage-release electronic control device a rechargeable battery pack unit, an electronic central unit based upon an electronic processing microcontroller with memory, and GPRS telecommunication device together with a transmit receive satellite modem; a Bluetooth wireless application software within an external unit; an electronic staggering deciphering device, based upon a Bluetooth receiver, connected to the electronic central unit.

18 Claims, 4 Drawing Sheets

(51) Int. Cl.
*G06Q 50/28* (2012.01)
*G08B 13/24* (2006.01)

(56) References Cited

U.S. PATENT DOCUMENTS

| | | | |
|---|---|---|---|
| 2006/0230114 A1* | 10/2006 | Auhagen | G06Q 10/107 709/206 |
| 2007/0040647 A1* | 2/2007 | Saenz | H04W 4/026 340/3.1 |
| 2007/0288294 A1* | 12/2007 | Olsen, III | G06Q 10/06 235/385 |
| 2009/0135015 A1* | 5/2009 | Dobson | H04Q 9/00 340/572.9 |
| 2009/0322510 A1 | 12/2009 | Berger et al. | |
| 2013/0117380 A1* | 5/2013 | Pomazanov | G06Q 10/107 709/206 |
| 2013/0201316 A1* | 8/2013 | Binder | G07C 3/02 701/2 |
| 2013/0214909 A1 | 8/2013 | Meijers et al. | |
| 2017/0161676 A1* | 6/2017 | Aji | G06Q 10/087 |
| 2017/0278059 A1* | 9/2017 | Aji | G06K 7/10297 |
| 2017/0357926 A1* | 12/2017 | McSheffrey | F17C 13/02 |
| 2018/0217615 A1* | 8/2018 | Westmoreland | G01M 3/3245 |
| 2018/0328079 A1* | 11/2018 | Lim | H04W 4/80 |
| 2022/0222616 A1* | 7/2022 | Harish | G06Q 10/087 |

\* cited by examiner

SYSTEM FOR LOGISTIC MONITORING, CONTROL AND PRESERVATION OF INVENTORY STOCKS OF GOODS

RELATED APPLICATION

This application is a national phase entry under 35 USC 371 of International Patent Application No.: PCT/IB2017/050657 filed on 7 Feb. 2017, the disclosures of which are incorporated in them entirety by reference herein.

FIELD OF THE INVENTION

The present invention relates to an assets and goods in transit protection system operated through a satellite telecommunications network and commanded wirelessly from a mobile cell phone, including the method of acknowledging the status of a logistic monitoring, control and preservation of inventory stocks of goods.

The system can be used in all kinds of conditions and manufactured on the basis of component parts and existing materials in the industry. Although this development has been made to solve an asset protection requirement, it has been discovered that multiple applications in the consumer market can be protected by the system.

BACKGROUND OF THE INVENTION

Statistics demonstrate that numerous thefts of products take place while traveling from one place to another with substantial losses, inefficiency and disorder throughout the supply chain of a particular activity.

In general the problem's origin is the lack of control devices with real time global monitoring and memory capabilities to check, locally and globally the status of the protection device at any time needed. Moreover, at the moment no system has been found that guarantees knowing if certain device has been undesirably opened previous it has reached its final destination.

Several products are available nowadays intending to protect cargo delivery. In general these products can be grouped in two major areas: Portable Locks and Fuel caps, wherein portable locks are used to seal enclosures used to store cargo and fuel caps are devices to protect the theft of own fuel used in transportation vehicles.

In both cases devices may be monitored to acknowledge certain status of the device, but are not active systems. Active means that the communication is in and out of the device on a permanent basis to basically send commands to the remote device to either perform predetermined command actions, such as engage-release the protection system.

Nowadays there are various products in the industry related to systems to protect the delivery of cargo. For example, within the known Portable Locks are devices such as Mobile Lock, Knock Lock, TAM 212 EMS Honeywell, Snatchlatch, among other.

In the same way, within fixed devices to protect fuel services—also called Fuel Caps—there are products such as Sole Diesel, Easy Fuel, Fuel loyal, Keydiesel, amongst others.

The disadvantages of the above mentioned devices are listed below:

Are fully portable. Not permanent fixed top the goods wanted to be protected.
Not necessarily fully traceable
Not Re usable
No backup battery or batteries are not necessarily rechargeable
User operations are not necessarily performed through a Mobile phone
Not necessarily customized
Not Inviolable
Not only opened by mobile phone application
Lack of GPS locator as part of the release equation
They only use GPRS and are not satellite monitored
Not necessarily Full weather condition (IP 67)
Need magnetic attachments so are vulnerable to be stolen easily
They do not have Global coverage without a roaming plan, including marine surface operations
They do not send a command to engage-release the protection device trough telemetry commands concept with predetermined secured configuration
Others do not recognize if a local command or satellite command may be needed and when local command needed do not have a predetermined secured array of special codes within the device memory to engage-release the fuel protector Another example of portable lock devices is disclosed by the Chilean patent application 3021-2013, which describes a portable, battery-powered electronic lock, operated through a satellite telecommunications network and commanded wirelessly from a mobile phone, as well as a method of opening the box of electromechanical mechanisms of said electronic lock.

The above mentioned system has an electronic wireless key to open the device. The opening happened only if the key was attached to the lock through a physical connection. When both units, key and lock, were placed together the mobile phone has to establish a communication path between the lock and the mobile phone. The reason of connecting the mobile phone application with the user this way is because the system is portable and needs the battery to remain connected to the back-office server all the time. Therefore, the energy to open the lock is delivered by the portable electronic key and operated only through the mobile phone blue tooth communication channel.

One disadvantage of the system disclosed in Application 3021-2013 is that it has to consider, as well, the logistics actions and the time needed to recharge the unit battery and the key battery. With no energy, due to the battery ran out of charge, after a certain amount of time actions such as telemetry could not be guaranteed. Other disadvantages of the system disclosed in Application 3021-2013 is the lack of a flow meter, a temperature sensor, a flew switch, which does not allow to perform any stock control applied to fluids. As well, the system disclosed in Application 3021-2013 was not designed for inventory control purposes, but to secure goods allocated in confined and remote places, in particular within containers and trucks trailers used to transport goods. The system disclosed in Application 3021-2013 was based upon the utilization of electromechanical solenoid action only, directly over a security latch, to lock-release the security latch.

Nowadays, wireless solutions are becoming a standard way of interconnection of electronic devices due to its easiness and less invasive actions to perform, when installing and deploying the systems. Thus, it becomes all an opportunity to have the largest range connection as possible when certain applications are needed to be sorted out through the distance. New practices have been developed around the concept of telemetry, which in the case of the present invention represents a novelty in the command and control actions to be performed remotely in search of efficiency and productivity.

Telemetry can be performed nowadays, but known equipment has not been thought neither designed to work as telemetry devices. The telemetry concept is vastly used in satellite operations and is basically used for attitude control of the satellites. The concept can be transferred as well to transportation of goods to evaluate the status of the good transported.

The aim of the invention is therefore the assurance, protection and real time monitoring of all type of goods, through uninterrupted global coverage control, while goods are moving, ensuring the sealing of the enclosures where they are being carried, from origin to destination, with an appropriate traceability of the goods at all times ensuring that the load is received by the recipient in a controlled and safe manner. As well, a support system for inventory control purposes of goods transported via terrestrial, and or maritime means.

A particular object of the invention is to protect the cargo and to measure input—output fluids as an inventory control method for fluid goods.

SUMMARY OF THE INVENTION

The invention relates to a combination of electronical, pneumatic and mechanical solutions that protects fuel and other transported goods, by the exchange of wireless control commands between tree user and the protection system.

In particular, the present invention consists in a system and method for logistic monitoring, control and preservation of inventory stocks of goods while they are transported by air, sea, land and/or kept in depository sites, through the processing of staggering coded commands, received remotely through wireless telemetry action.

The system comprises a protector device which is an active device that can be commanded locally and/or remotely from a global point of view. This means that an open command request can be performed locally, just beside the protection system and acknowledged to open remotely, just by connecting to the World Wide Web cloud—INTERNET—in automatic mode or human backed up mode.

The protector device is a system that fits in between portable locks and Fuel caps. The protector proposed does not protect for instance the fuel used by a transportation vehicle, but for the fuel transported as bulk cargo, for example a 30 m3 distribution fuel tank truck.

In a preferred embodiment, the present protector device locks-releases a security latch through compressed air energy driven by an electromechanical solenoid, wherein said lock-release latch is installed in the input-output pipes of a tank to protect the cargo and to measure input—output fluids as an inventory control method.

Advantageously, in the present version no recharging is needed because the unit is attached to the vehicle's power source. Although the proposed protector is connected to the vehicle's autonomous power source, it still has a backup battery in case of energy micro cuts. The charge of this battery is performed automatically through a dedicated recharging control circuit.

Other advantage of the present invention is that telemetry actions are available at any time in a real time monitoring basis. As well, by adding a number of sensors such as a thermometer, a flow meter for volume measurements, a flow switch to know in which direction the fluids circulate, i.e. input or output, and a tell-back device, all of them located within a customized ring placed between two pipe flanges and tightened through nuts and bolts around a gasket at both sides of the rind to indicate the opened or dosed status of the valve acting as a locking device in a particular geographical location, enables the system to lock it irregular and or undesired opening attempts are performed. Finally, the most meaningful advantage is the property of the system to send warning messages to a predefined final user, whenever irregular opening attempts or unexpected opening sequences are taking place over the protector system.

The protector is linked, on a permanent basis, to the Back-Office server, used to control and command any of the deployed protectors. This way all the sensors and engaging devices, which are part of this transmitting and recording protection instrument, are monitored and stored on a permanent basis for the monitoring of the actual status and alert warning messages available in case of undesired operational conditions.

According to a first aspect of the invention, it is proposed a system for logistic monitoring, control and preservation of inventory stocks of goods while they are transported by air, sea, land and/or kept in depository sites, through the processing of staggering coded commands, received remotely through wireless telemetry actions. The system comprises:

an inventory stock control and monitoring system, provided with status measurement sensor, electromechanical and pneumatic device, pneumatic siding actuator device, sliding actuator engaging device, engage-release electronic control device a rechargeable battery pack unit, an electronic central unit based upon an electronic processing microcontroller with memory, and GPRS telecommunication device comprising a transmit receive satellite modem;

a Bluetooth wireless application software within an external unit;

an electronic staggering deciphering device, based upon a Bluetooth receiver, connected to the electronic central unit.

The electronic central unit is connected to the transmit receive satellite modem and to rechargeable support battery pack unit with over and under voltage protection device. In addition, the engage-release electronic control device is connected to a compressed air reservoir tank which is supported by a pneumatic safety protection device connected to an external autonomous compressed air main reservoir.

According to a first embodiment of the invention, a satellite interconnection of the electronic central unit and a satellite connection gateway, comprises a software application for satellite upstream telecommunication connection and downstream telecommunication connection, between a world wide web connection and the inventory stocks control and monitoring system.

According to a second embodiment of the invention, the inventory stocks control and monitoring system intercommunicates with a World Wide Web connection through a communication path to a receiving GPRS gateway.

The system comprises an inventory stock control and monitoring system back office management server with administration and operations data base, linked to the World Wide Web connection through an intranet software connection and datalink application software for satellite connection gateway. Preferably, said datalink application software is based on TCP-IP technology.

According to a preferred embodiment of the invention, the Bluetooth receiver is intercommunicated with the external unit through a staggered coded communication path.

In addition, there is a first link connection between pneumatic sliding actuator device and engage-release electronic control device, a second link connection between the engage-release electronic control device and electromechanical and pneumatic device, a third link connection between the engage-release electronic control device and the compressed air reservoir tank, and a fourth link connection between the compressed air reservoir tank and the pneumatic safety protection device. Preferably, said link connections are physical pneumatic connections which consist of a hollow tube for compressed air conduction, surrounded by electric cables, covered by an external protector shield, whose construction and assembly is coaxial structure.

According to a preferred embodiment of the invention, the satellite modem, the electronic central unit, the Bluetooth receiver, the battery pack unit and the voltage protection device are located within an electronic control and communications assembly, which can include also a GPRS receiver.

The electronic central unit is connected with the engage-release electronic control device, sliding actuator engaging device and status measurement sensor through physical links.

In system proposed, the external unit can be a smartphone, tablet, a laptop or my other portable apparatus.

According to a second aspect of the invention, a method of acknowledging the status of a logistic monitoring is proposed, whereas control and preservation of inventory stocks of goods are guaranteed while they are transported by air, sea, land and/or kept in depository sites, through the processing of staggering coded commands, received remotely through wireless telemetry actions, the method comprising the steps of:

Interlace a Bluetooth device of an external unit into a Bluetooth receiver of a an inventory stock control and monitoring system of the system described above;

send to said Bluetooth receiver a staggering coded command to receive the status of said an inventory stocks control and monitoring system;

send acknowledgment actions from the inventory stocks control and monitoring system to release and reset a status measurement sensor, a electromechanical and pneumatic device, a pneumatic sliding actuator device, and engage-release electronic control device.

The inventory stock control and monitoring system back office management server collects the following monitoring data for validation and proof:

Satellite Almanac Data; Information about the time and status an entire satellite constellation.
Satellite Modern Serial Number: The unique number which determines a satellite modem identification.
UTC Date and time: UTC is the time standard commonly used across the world
User Id of requester: The identification of a person ID who asks for protector device release authorization.
User Name: The identification of any person's name using the protector system
Request Validator User Id: The identification of a person ID defined as the validator in the overall protector system.
Request Validator Acknowledgment: The validator in the overall system confirmation action of an opening command order in the system.
Speed: The modulus—absolute value—of the velocity at which the vehicle moves, where the solution is installed.
Height: The geographical altitude over average sea level at which the vehicle moves, where the solution is installed
Geographical Location: Any location that has solid ground such as a country, island or panhandle on the surface of the Earth.
Sensor Status
Active-Idle
Release Devices Status
Engaged-Released According to a first embodiment of the method, the staggering coded command to acknowledge and release the status of the stock control and monitoring system is sent from the satellite modem to the Bluetooth receiver through a microcontroller and interface within an electronic control unit.

According to a second embodiment of the method, the staggering coded command to acknowledge and release the status of the inventory stocks control and monitoring system is sent from a GPRS device to the Bluetooth receiver through a microcontroller and interface within an electronic control unit.

The status request staggering coded command is sent to the status measurement sensor, to the electromechanical and pneumatic device and to pneumatic sliding actuator device via the engage-release electronic control device. The method also comprises the engagement-release of the monitoring status of the inventory stocks control and monitoring system.

Preferably, the method comprises validating a warning message sent to the inventory stocks control and monitoring system it all devices status do not follow a predetermined monitoring sequence, according to expected satellite almanac readings and memory preloaded records within the electronic control unit. Furthermore, any unauthorized or unexpected handling and or intervention of the inventory stocks control and monitoring system is recorded in the memory within the electronic control unit and utterly transmitted through the satellite modem to an end supervisor.

In a third aspect of the invention a security device such as fuel protector is proposed to be used in the system for logistic monitoring, control and preservation of inventory stocks mentioned above.

In order that the present invention may be more readily understood, embodiments thereof will now be described with reference to the accompanying drawings.

DETAILED DESCRIPTION OF THE DRAWINGS

The invention discloses a receiver and transmitter system to protect the goods transported in all sorts of transportation media, able to transmit and receive encrypted staggering commands, remotely, via an external device monitored, controlled and commanded in real time for releasing-engaging the access to the goods under protection, composed of multiple devices and elements whose operation is described in the next paragraphs.

Figure 1:
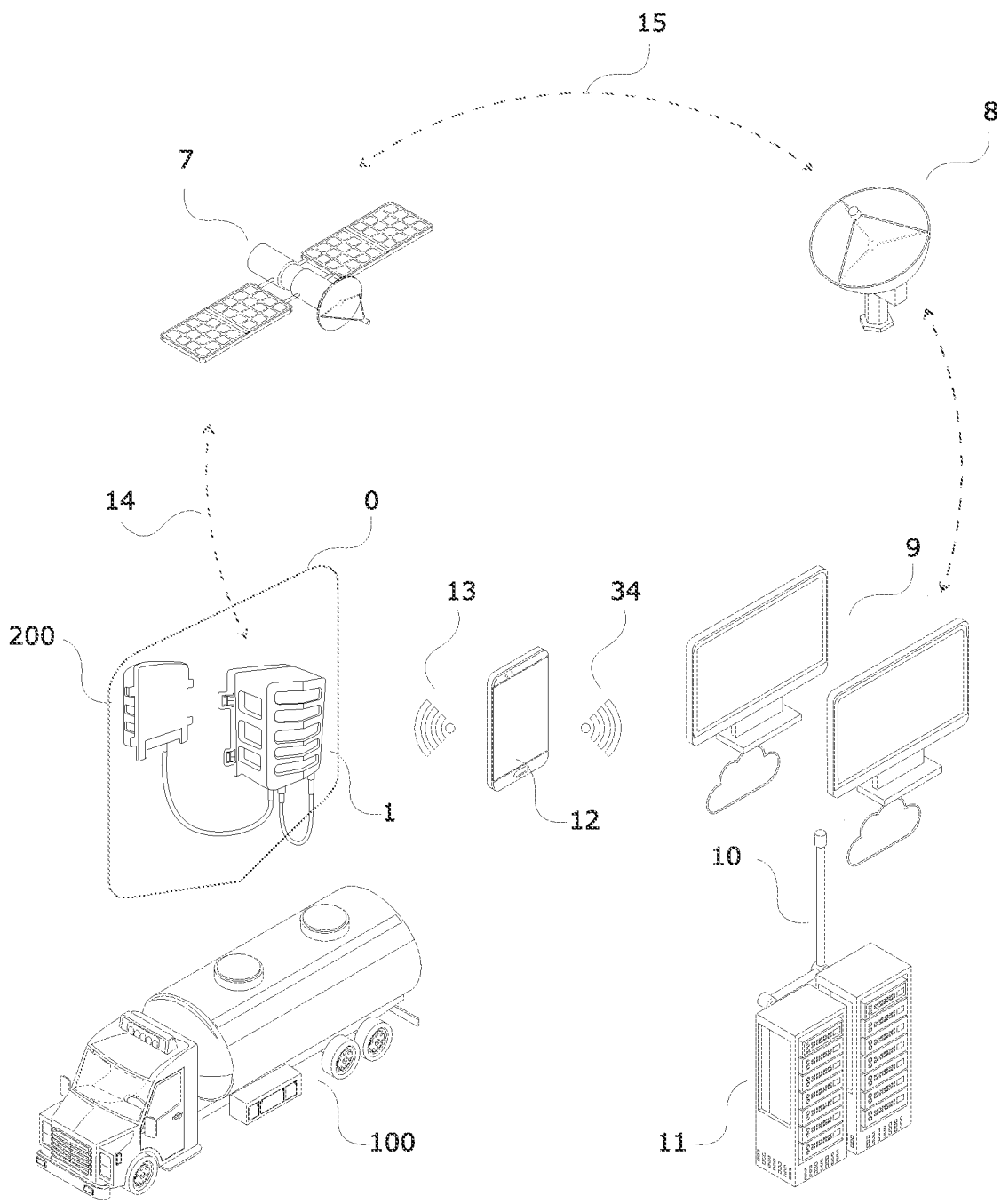
FIG. 1 illustrates a general topology of the system proposed.

According to FIG. 1, the claimed system comprises an electronic control and communications assembly 1 which can be installed in transportation vehicles such the fuel transportation vehicle 100 of FIG. 1. The assembly 1 is connected with a security device 200 forming an inventory stock control and monitoring system 0. In the example illustrated the security device 200 is a fuel protector.

The whole assembly 1 intercommunicates with an external unit 12 through staggered coded communication path 13. Said external unit 12 can be a smartphone, a tablet, a laptop or any other suitable apparatus with a dedicated code application that can establish a communication link between a user end and the assembly 1.

On the other hand, the assembly 1 intercommunicates with a World Wide Web connection 9 through either communication path 34 to a receiving GPRS gateway linked to the World Wide Web connection 9 or upstream telecommunication connection 14 and downstream telecommunication connection 15 via a terrestrial orbit satellite 7 to a satellite connection gateway 8 linked also to the World Wide Web connection 9. Said World Wide Web connection 9 is connected to a back office management server 11 through intranet software connection 10.

The satellite 7 connection in the present system is a mutual connection between a satellite signal and a modem located within the assembly 1 in order to collect information or for communication: for example, monitor the status of the following fields: Device ID. Mode of operation. Temperature, Volume Measurement. Lock status, Geographical Location, Ground Speed of the Vehicle, battery charge status and on the field wireless communication status. Furthermore, upstream telecommunication connection 14 corresponds to a set of computer codes used to produce a link to transmit radio telecommunications signals via a transponder. It creates a communication channel between the invention's transmitter and a receiver at different locations on Earth, by the enabling of a datalink software which allows a private gateway connection between a satellite communication provider and the system software. Additionally, the system uses a datalink application software which is the telecommunication link, enabling program to connect with the orbital satellite over which the data is transmitted to the users of the system.

On the other hand the back office server 11 is preferably a computer allocated in a web service site having a computer code program, accessed remotely, to manage the smart fuel protector system; for example, monitor the status of the following fields: Device ID, Mode of operation, Temperature, Volume Measurement, Lock status, Geographical Location, Ground Speed of the Vehicle, battery charge status and on the field wireless communication status. Furthermore, the intranet software connection 10 is a local or restricted communications network, especially a private network, created using World Wide Web software to connect the present system to its operational datalink.

According to preferred embodiments of the invention the World Wide Web connection is an Internet cloud or any other information space where documents and other web resources are identified by Uniform Resource Locators (URLs), interlinked by hypertext links, and can be accessed via the Internet.

Furthermore, the GPRS gateway is preferably an electronic unit of a central part of the general packet radio service (GPRS) which allows 2G, 3G and WCDMA mobile networks to transmit IP packets to external networks such as the Internet. The GPRS system is an integrated part of the GSM network switching subsystem. The network provides mobility management, session management and transport for Internet Protocol packet services in GSM and WCDMA networks.

Figure 2:
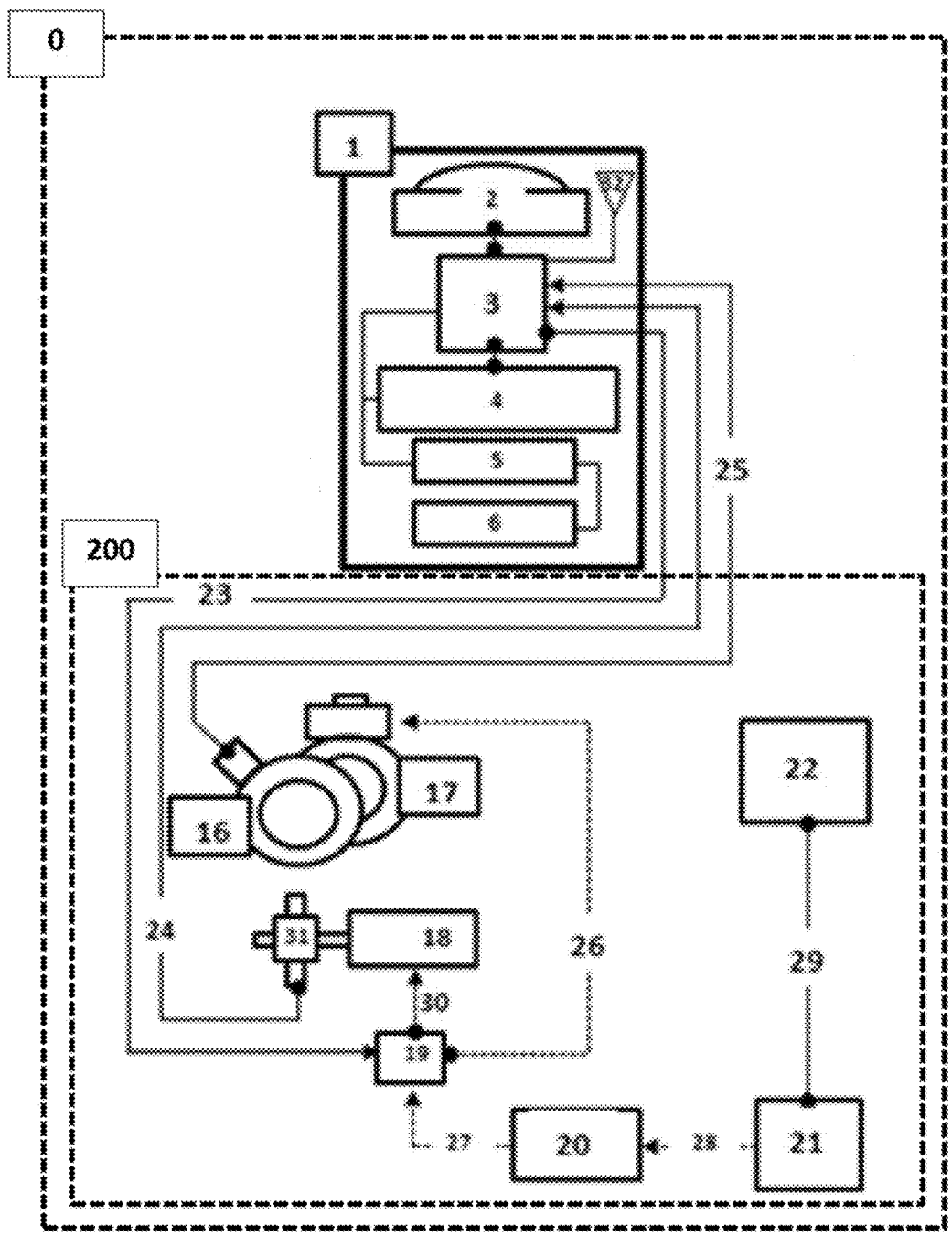
FIG. 2 illustrates in details the inventory stock control and monitoring system proposed.

According to FIG. 2 the inventory stock control and monitoring system 0 is displayed wherein the electronic control and communications assembly 1 is preferably an enclosure comprising a transmit receive satellite modem 2 connected to a GPRS receiver 32, an electronic central unit (ECU) 3, a Bluetooth receiver 4, a battery pack unit 5 and a voltage protection device 6.

The ECU 3 is a small computer circuit installed on a single integrated printed board with a processor core memory. It includes programmable input/output peripherals with extended electronics capable to store microchip coding and carrying out the instructions of a computer program by performing the basic arithmetic, logical, control and input/output (I/O) operations specified by the instructions.

Furthermore, the satellite modem 2 is a wireless telecommunication device of an earth orbital machine used to either broadcast to send out or take delivery of something sent or communicated.

The battery pack unit consists in a battery array which can be charged, discharged into a load, and recharged many times, while a non-rechargeable or primary battery is supplied fully charged, and discarded once discharged. The battery pack is connected to the voltage protection device which is preferably an electronic unit used to avoid running directly below of a pre-arranged voltage level.

The electronic control and communications assembly 1 monitors and commands a status measurement sensor 16 (illustrated in details in FIGS. 4a-4c), an electromechanical and pneumatic device 17 and pneumatic sliding actuator device 18 through physical link 23 connected between the electronic central unit 3.

The status measurement sensor 16 is a device which detects or measures and records, indicates, or otherwise responds to it at a particular time while fuel loading-unloading is taking place.

The electromechanical and pneumatic device 17 is a compressed air activated unit which allows opening and shutting a blocking valve, including the tell-back status of the valve when it is either opened or shut. The operation is performed with compressed air and driven by electrical solenoid controlling the compressed air flow. Similarly, the pneumatic sliding actuator device 18 is a mechanical device moving forward and backwards in a linear pre set range which is operated with compressed air and also driven by electrical solenoid controlling the compressed air flow.

The electronic control and communications assembly 1 commands also an engage-release electronic control device 19 which is an electrical driven piece with the ability to manage the pneumatic sliding actuator device 18 and/or the electromechanical and pneumatic device 17 in such way that either devices are moved or removed from secure to unsecure status, through commands produced at the electronic control and command assembly 1, by user intervention, in a remote communication operation. The engage-release electronic control device 19 triggers the pneumatic sliding actuator device 18 through a first link connection 30 and second link connection 26 to engage-release the electromechanical and pneumatic device 17.

A sliding actuator engaging device 31 is connected to the pneumatic sliding actuator device 18, wherein said actuator engaging device 31 is a mechanical fixed device used to receive and secure, within it, a mechanical sliding rod moving forward and backwards in a linear pre-set range used as the female end of a latch to block tank too hatches and or doors and or cabinets and or safety protection air brakes and or other customized safety protection devices, which are operated with compressed air and driven by electrical solenoid controlling the compressed air flow. It is connected to the electronic control unit 3 through a physical link 24.

On the other hand a physical fink 25 is configured to read and drive status measurement sensor 16 that works together with the electromechanical and pneumatic device 17.

The engage-release electronic control device 19 is physically connected to an air reservoir tank 20 through a third link connection 27. Said tank is preferably a receptacle storage chamber to hold compressed air at more than atmospheric pressure to use it in the blocking valve 17 and at the pneumatic sliding actuator device 18, used as the male end of a latch to block tank top hatches and or doors and or cabinets and or safety protection air brakes and or other customized safety protection devices. It is connected as well to a pneumatic safety protection device 21, through a fourth link connection 28 and supported by a compressed air independent main reservoir 22 through a link 29.

The pneumatic safety protection device 21 is a check valve device which ensures the compressed air reservoir tank always remains tilled with compressed air. On the other hand, the compressed air main reservoir 22 keeps a permanent amount of compressed air needed to operate the whole system. This source of compressed air energy is provided from a source outside with the freedom to act independently.

Figure 3:
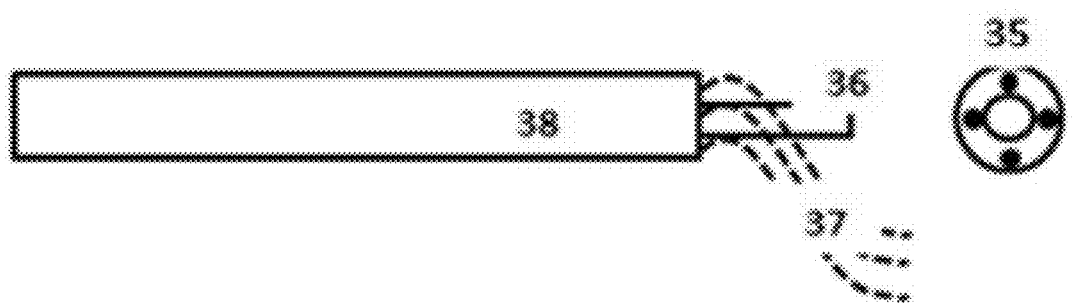
FIG. 3 illustrates the physical pneumatic connections used in the security device proposed.

According to FIG. 3, links 26, 27, 28 and 30 are physical pneumatic connections which consist of a hollow tube for compressed air conduction, surrounded by electric cables, covered by an external protector shield, whose construction and assembly is coaxial structure 29, in other words, it is an electrical cable with two or more three-dimensional linear forms sharing a common axis, embedded within the status measurement sensor 16 (Shown in FIGS. 4a to 4c), which is installed between the output valve's electromechanical and pneumatic device 17 and the bottom outlet of the tank 20.

Figure 4A:
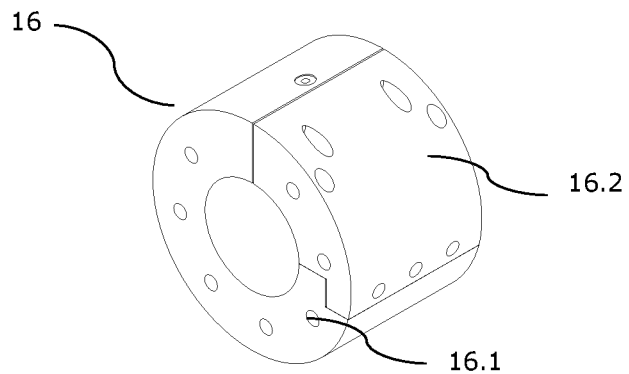
FIGS. 4a-4c illustrates in detail the status measurement sensor of the invention.
Figure 4B:
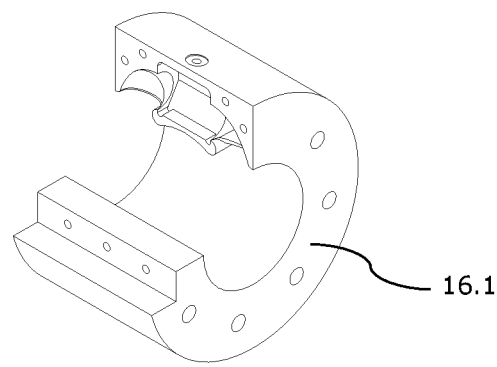
Figure 4C:
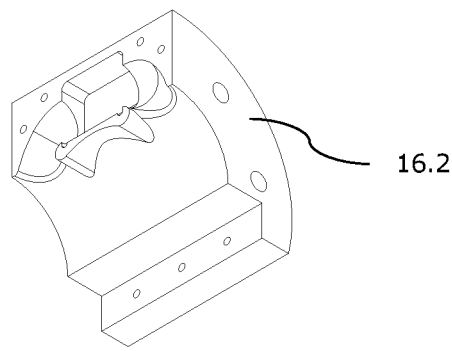

According to FIGS. 4a-4c the status measurement sensor (16) is a ring with a built in flow switch, thermometer and flowmeter devices. It comprises two parts, the main body (16.1) and the cover (16.2), both needed to encapsulate the flow switch within the ring. It allocates as well the thermometer and the flow meter in a radial disposition (not shown).

Preferably, the sensor (16) is located in the pipe desired to secure, specifically between two pipe flanges and tightened through nuts and bolts around a gasket at both sides of the ring.

The invention claimed is:

1. A system for inventory control of liquid transported as bulk cargo on a vehicle comprising a tank for the liquid, the system comprising a security control device, and an external unit comprising application software for enabling short-range wireless communication between electronic devices, wherein the vehicle comprises a pipe for input and output of the fluid into and out of the tank and a cap that is lockable to prevent access to the fluid in the tank, the security control device comprising:
   (a) sensor means for monitoring at a specific geographical location a status of the liquid in the tank;
   (b) an air reservoir tank comprising compressed air;
   (c) pneumatic sliding actuator means connected to the air reservoir tank for causing a rod to pass from a first position wherein the cap is unlocked to a second position wherein the cap is locked when compressed air from the air reservoir tank passes to the pneumatic sliding actuator means;
   (d) valve means connected to the air reservoir tank that is movable from a nonblocking position, in which fluid can pass through the pipe, to a blocking position in which the valve means blocks fluid from passing through the pipe when compressed air from the air reservoir tank passes from the air reservoir tank to the valve means;
   (e) engage-release control means for controlling release of the compressed air from the air reservoir tank upon receipt of a command to cause the pneumatic sliding actuator means to slide to the first position to lock the cap and/or to cause the valve means to move to the blocking position to block the flow of fluid through the pipe at the specific geographical location; and
   (f) control and communications assembly means for interconnection with a satellite connection gateway for monitoring an inventory level of the liquid in real time, for monitoring status information from the sensor means as to the status of the liquid in the vessel, for relaying the status information to a unit that is external to the vessel, for receiving commands from the external unit to lock the cap and/or to block the flow of the liquid through the pipe based on the status information, and for relaying the commands to the engage/release control means;
wherein the sensor means, the air reservoir tank, the pneumatic sliding actuator means, the valve means, the engage/release control means and the electronic control unit are disposed in the vehicle.

2. The system according to claim 1, wherein the sensor means comprises a status measurement sensor in a shape of a ring, the status measurement sensor comprising a flow switch, a thermometer and a flowmeter.

3. The system according to claim 2, wherein the status measurement sensor is disposed in the pipe between a plurality of flanges of the pipe.

4. The system according to claim 2, wherein the status measurement sensor is disposed between the valve means and an outlet of the air reservoir tank.

5. The system according to claim 1, wherein the valve means comprises a blocking valve driven by an electrical solenoid configured to open and shut the blocking valve and to provide tell-back status of the valve when it is open or shut.

6. The system according to claim 1, wherein the pneumatic sliding actuator means comprises a pneumatic sliding actuator device configured to move forward and backward in a linear pre-set range, the pneumatic sliding actuator device being driven by an electrical solenoid that controls compressed air flow to the device.

7. The system according to claim 6, wherein the pneumatic sliding actuator means comprises a sliding actuator engaging device connected to the pneumatic sliding actuator device.

8. The system according to claim 1, further comprising a main reservoir for supplying compressed air to the air reservoir tank and a check valve device connected to the main reservoir and to the air reservoir tank for ensuring that the air reservoir tank is always filled with compressed air from the main reservoir.

9. The system according to claim 8, comprising a first link connection between the pneumatic sliding actuator means and the engage-release control means, a second link connection between the engage-release control means and the valve means, a third link connection between the engage-release control means and the air reservoir tank, and a fourth link connection between the air reservoir tank and the check valve device.

10. The system according to claim 9, wherein each of the first, second, third and fourth link connections comprises a hollow tube for compressed air conduction surrounded by electric cables that are covered by a protector shield.

11. The system according to claim 1, wherein the control and communications assembly means comprises an electronic central unit comprising an electronic processing microcontroller with memory, a General Packet Radio Service (GPRS) telecommunication device together with a transmit receive satellite modem, an electronic staggering deciphering device based upon a receiver for enabling short-range wireless communication between electronic devices connected to the electronic central unit, a voltage protection device and a rechargeable battery pack unit.

12. The system according to claim 1, wherein the control and communications assembly comprises a software application for satellite upstream telecommunication connection and downstream telecommunication connection between a world wide web connection and the control and communications assembly.

13. The system according to claim 12, further comprising a backoffice management server with administration and operations database linked to the world wide web connection through an intranet software connection and datalink application software for the satellite connection gateway.

14. The system according to claim 13, wherein the datalink application software is based on Transmission Control Protocol (TCP)—Internet Protocol (IP) technology based on a geographical positioning command from a mobile cell phone using communication means for enabling short-range wireless communication between electronic devices.

15. The system according to claim 1, wherein a receiver for enabling short-range wireless communication between electronic devices is intercommunicated with the external unit through a staggered coded communication path.

16. The system according to claim 1, wherein the external unit is a portable device.

17. The system according to claim 16, wherein the external unit is a smartphone, a tablet or a laptop.

18. The system according to claim 1, wherein the sensor means comprises a thermometer, a flowmeter, a flow switch and a tell-back device.

* * * * *